(12) United States Patent
Davis et al.

(10) Patent No.: US 7,461,000 B2
(45) Date of Patent: Dec. 2, 2008

(54) SYSTEM AND METHODS FOR CONDUCTING AN INTERACTIVE DIALOG VIA A SPEECH-BASED USER INTERFACE

(75) Inventors: Brent L. Davis, Deerfield Beach, FL (US); Vanessa V. Michelini, Boca Raton, FL (US); Melanie D. Polkosky, Collierville, TN (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 10/968,594

(22) Filed: Oct. 19, 2004

(65) Prior Publication Data

US 2006/0085192 A1    Apr. 20, 2006

(51) Int. Cl.
*G10L 21/00*    (2006.01)
*G10L 11/00*    (2006.01)
*G10L 15/00*    (2006.01)

(52) U.S. Cl. .................. 704/275; 704/270; 704/257
(58) Field of Classification Search .................. None
See application file for complete search history.

(56) References Cited

U.S. PATENT DOCUMENTS

| | | | |
|---|---|---|---|
| 5,893,101 A * | 4/1999 | Balogh et al. ............ 707/100 |
| 6,012,030 A * | 1/2000 | French-St. George et al. ............ 704/275 |
| 6,314,402 B1 | 11/2001 | Monaco et al. |
| 6,377,662 B1 | 4/2002 | Hunt et al. |
| 6,505,155 B1 | 1/2003 | VanBuskirk et al. |
| 6,598,022 B2 | 7/2003 | Yuschik |
| 6,731,307 B1 | 5/2004 | Strubbe et al. |
| 7,212,966 B2 * | 5/2007 | Kyomitsu ............ 704/233 |
| 2002/0107695 A1 * | 8/2002 | Roth et al. ............ 704/275 |

* cited by examiner

*Primary Examiner*—David R. Hudspeth
*Assistant Examiner*—Matthew J. Sked
(74) *Attorney, Agent, or Firm*—Akerman Senterfitt

(57) ABSTRACT

A system and methods are provided for conducting an interactive dialog via a speech-based user interface. The system includes an auditory prompt module for generating a sequence of goal-directed auditory prompts based upon a pre-determined user-oriented task, and an error recovery module for responding to a communication error by initiating an error recovery based upon a user response to the sequence of goal-directed auditory prompts. The error recovery includes providing at least one error-recovery prompt selected from a hierarchy of error-recovery prompts, the selection based upon a hierarchy of communication error types.

11 Claims, 2 Drawing Sheets

SYSTEM AND METHODS FOR CONDUCTING AN INTERACTIVE DIALOG VIA A SPEECH-BASED USER INTERFACE

BACKGROUND

1. Field of the Invention

The present invention is related to the field of speech communication, and, more particularly, to speech-based user interfaces.

2. Description of the Related Art

A user interface is the component that allows a user to input into a computer system the various instructions and/or data used by the computer system in carrying out any of a multitude of processing tasks. Various types of user interfaces presently exist, most being implemented through a combination of hardware or software. One of the most promising user interface types, both in terms of future uses and further development, is the speech-based user interface.

The speech-based user interface has dramatically expanded the range of uses to which computers can be put. The speech-based user interface can, in many circumstances, obviate any need for text-based input via a keyboard or graphical input via a graphical user interface (GUI). This enables a user to access a computer system without using a computer terminal, an occurrence common when interfacing with embedded devices, small mobile devices, and telephony-based voice-response systems. Consequently, the speech-based user interface has extended the reach of various types of computer systems by making them usable simply on the basis of ordinary spoken language. Indeed, as a result of the speech-based user interface, there is an expanding array of computer systems for conducting banking transactions, making airline reservations, and carrying out a host of other functions merely on the basis spoken commands.

Speech-based user interfaces typically rely on automated speech recognition for converting speech into machine-readable instructions and data. In general, speech recognition involves the transformation of acoustic signals into electronic signals that, in turn, are digitized for electronic processing by the speech recognition device. Regardless of the sophistication of the underlying technology, however, there is inevitably some risk inherent in any user-machine dialog via a speech-based user interface that a communication error will occur, just as there is in the case of human-to-human communications.

Accordingly, conventional speech-based user interfaces typically rely on techniques such as help messages and supplemental information provided, for example, by a text-to-speech (TTS) processor to guide a user through an automated, speech-only exchange or dialog with a computer system or speech recognition device. Often times, though, users of speech-based interfaces find these help messages and informational guides repetitive and unhelpful. Many speech-based user interfaces operate as though only two types of communication errors occur: either the user is unaware of the need for a user utterance at some point during an interactive dialog, which results in a time-out error, or secondly the user utterance given is unrecognizable to the user interface because it is not part of the user interface grammar.

In many contexts, however, communication errors are more complex, and the conventional assumption about the nature of the errors is thus overly simplistic. Conventional speech-based user interfaces thus tend not to address speech recognition communication errors in a manner comparable to the way such errors are recognized and handled in ordinary human-to-human conversations. Accordingly, the processes employed for error recovery with such speech-based user interfaces do not reflect the natural responses that would follow from a human-to-human miscommunication or communication error. This, in turn, can make user-machine dialogs via a speech-based user interface less pleasant and more difficult as compared with human-to-human communications.

Moreover, conventional error recovery processes also tend to lack the complexity needed to deductively determine the nature of a communication error in a dialog via a speech-based user interface. It follows, that these processes also typically fail to provide a targeted response to a communication error.

SUMMARY OF THE INVENTION

The present invention provides a system and methods for conducting a user dialog via a speech-based user interface. A system according to one embodiment of the present invention can include an auditory prompt module that generates a sequence of goal-directed auditory prompts. The sequence of goal-directed auditory prompts can be based upon a pre-determined user-oriented task. The system can further include an error recovery module responsive to a communication error. The error recovery module can initiate an error recovery based upon a user response to a particular prompt of the sequence of goal-directed auditory prompts. In carrying out the error recovery, the system can include determining a type of the communication error from a hierarchy of communication error types based upon sequential analysis of a user response to the particular prompt. The hierarchy of communication error types can include an acoustical error, a lexical error, a syntactical error, and a conceptual error. An acoustical error can occur when a volume at which the user response is provided is not within a predetermined audible range. A lexical error can occur when there is no match between the user response and a list of pre-designated acceptable responses. A syntactical error can occur when there is no match between parts of speech of the user response and expected parts of speech. A conceptual error can occur when the user response is not within an activated grammar corresponding to the sequence of goal-directed auditory prompts. The error recovery also can include providing at least one error-recovery prompt sequentially selected from a hierarchy of error-recovery prompts. The sequential selection of an error-recovery prompt can be based upon a hierarchy of communication error types.

According to still another embodiment, a method for conducting a user dialog via a speech-based user interface can include providing a sequence of goal-directed auditory prompts, the sequence of goal-directed auditory prompts being based upon a pre-determined user-oriented task. The method also can include for each prompt, determining if there is a communication erro; and responding to the communication error, if one occurs, by initiating an error recovery. The error recovery can include determining a type of the communication error from a hierarchy of communication error types based upon a sequential analysis of a user response to the particular prompt, the hierarchy of communication error types including an acoustical error, a lexical error, a syntactial error, and a conceptual error, wherein an acoustical error occurs when a volume at which the user response is provided is not within a predetermined audible range, wherein a lexical error occurs when there is no match between the user response and a list of pre-designated acceptable responses, wherein a syntactical error occurs when there is no match between parts of speech of the user response and expected parts of speech, and wherein a conceptual error occurs when a user fails to provide any auditory response within a pre-defined time interval or when the user response is not within an activated grammar corresponding to the sequence of goal-directed auditory prompts; and providing at least one error-recovery prompt selected from a hierarchy of error-recovery prompts, the selection being based upon a hierarchy of communication error types.

Yet another embodiment of the present invention is an apparatus for conducting a user dialog via a speech-based user interface. The apparatus can include a computer-readable storage medium. The computer-readable medium can store computer instructions for providing a sequence of goal-directed auditory prompts, each based upon a pre-determined user-oriented task, and for responding to a communication error by initiating an error recovery if a communication error occurs.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
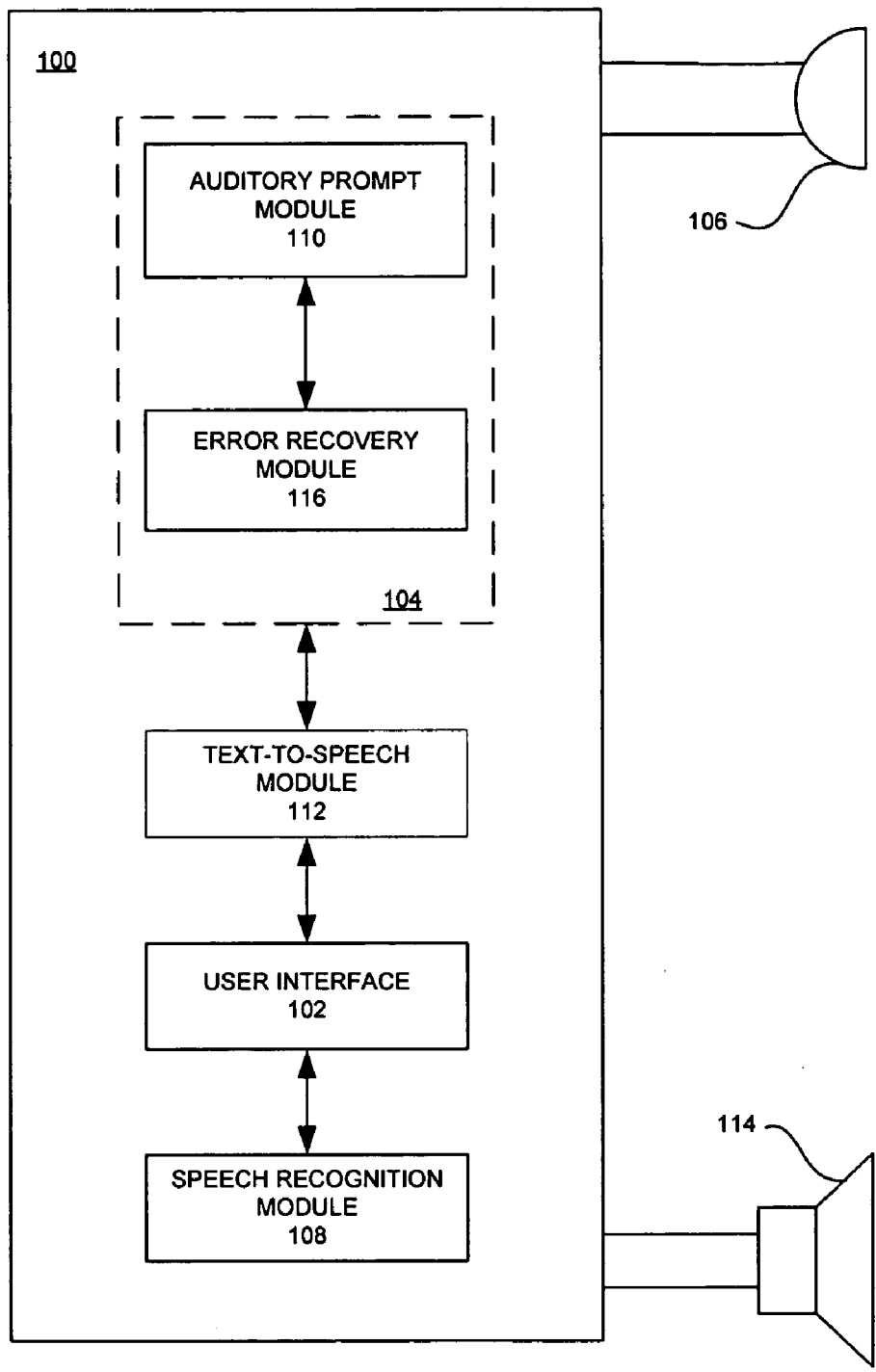
FIG. 1 is a schematic diagram of a computing device that includes a system for conducting a user dialog via a speech-based user interface according to one embodiment of the present invention.

FIG. 1 is a schematic diagram of a computing device 100 having a speech-based user interface 102. As illustrated, the speech-based user interface 102 is communicatively connected to a system 104 for conducting dialogs via the user interface according to one embodiment of the present invention. The dialogs conducted by the system 104 serve as a mechanism by which a user enters instructions and/or data into the computing device 100. The computing device 100 can be any device for processing instructions and data in the form of electrical signals, and having a speech-recognition capability such that the instructions and data can be supplied by voice input. Accordingly, the computing device 100 can be, for example, a general-purpose computer such as a mainframe or personal computer (PC) that includes dedicated circuitry and/or software for implementing speech recognition. Alternately, the computing device 100 can be a special-purpose computer such as a voice server. Still other examples of the computing device 100 include a mobile phone, a personal digital assistant (PDA), and any of a host of embedded devices familiar to those of ordinary skill in the art.

In general, the computing device 100 can be based on a standard architecture and can include a processor (not shown) for executing instructions and memory (also not shown) connected to the processor for storing instructions and data entered by the user via the speech-based user interface 102. The speech-based user interface 102 is illustratively implemented as a software program that can be configured to be stored in the memory and executed by the processor of the computing device 100. Similarly, the speech recognition module 108 is illustratively implemented by software-configured to be run on the computing device 100. The speech recognition module illustratively operates cooperatively with the speech-based user interface 102 in translating the user-supplied voice signals into the digitized instructions and data that can be stored and processed by the computing device 100. Although illustratively implemented as software-based instructions, either or both of the speech-based user interface 102 and/or the speech recognition module 108 can be implemented using dedicated hardwire circuitry or a combination of dedicated hardwire circuitry and software.

Instructions and data are illustratively entered into the computing device 100 by the user speaking into a microphone 106 that is connected to the computing device 100 for receiving user-supplied acoustic signals. As will be readily understood by one of ordinary skill in the art, these same acoustic signals are illustratively transformed into electrical signals and digitized for processing by the computing device 100 using the speech recognition module 108 incorporated within the computing device as illustrated.

The instructions and/or data entered into the computing device 100 by the user can be used to control various processing activities carried out by the computing device. Thus the instructions and data can be as varied as the many applications for which the computing device 100 can be used. For example, if the computing device 100 is a voice server, a user can carry out various functions or transactions over a conventional telephone communicatively linked to the speech-based user interface 102 of the computing device. Such transactions include conducting financial transactions with a designated bank or making reservations with a designated airline by way of spoken instructions and/or information transferred over the telephone into the voice server via the speech-based user interface 102. Another example would be if the computing device 100 serves as a interactive controller for an auxiliary device such as a machine or a multi-task processing plant. In such event, control is effected by the user issuing spoken commands to the controller via the speech-based user interface 102. Various other types of transactions, as well as more general applications, can similarly be performed depending on the particular nature of the dialog conducted by the system 104, as explained in more detail below.

Though not specifically shown, it will be readily understood by one of ordinary skill in the art that the speech recognition module 108 can include algorithmic modules based on one or more models such as an acoustic model, a lexical model, and a language model. Illustratively, the speech recognition module 108 generates a spectral representation derived from the digitized, time-varying signal by sampling the signal, typically at a fixed rate such as once per every 10 or 20 milliseconds. Through a process of feature detection, segmentation and identification, and matching, the speech recognition module 108 causes the computing device 100 to generate computer-readable instructions and data elements from the spectral representation of the user-supplied voice input.

For each task to be performed by the computing device 100, there can be a corresponding dialog that comprises the particular speech-based instructions and/or information that is entered by the user via the speech-based user interface 102 to effect the specific task. The particular dialog is conducted or controlled by the system 104. The system 104 illustratively includes an auditory prompt module 110 that generates a sequence of one or more auditory prompts. Each of these auditory prompts is a goal-directed prompt in the sense that each sequence of one or more prompts corresponds to the particular dialog for completing the specific user task. The dialog can vary widely and can be designed to perform any number of tasks. For example, as alluded to above, the dialog may be designed to allow the user to conduct an automated financial transaction, make an airline reservation, control a machine or plant, or accomplish various other tasks based upon verbal instructions and data entered via the user interface 102.

A simple example of a dialog that could be conducted by the system 104 involves an automated directory assistance application. According to this example, the computing device 100 operates as a voice server connected, for example, to a telephone network over which callers are able to access the voice server. Through a telephone connection to the voice server, a caller supplies speech input to the voice server via the speech-based user interface 102, and prompts are conveyed to the caller via the text-to-speech module 112. The goal to which the prompts are directed is the caller's ascertaining the number of the person the caller is trying to reach. The following illustrates a dialog that could be conducted by the system 104 for this scenario provided that no communication errors occur:

(System): "Welcome to directory assistance. What is the name of the person you wish to contact?"
(Caller): "Bob Jones."
(System): "Thank you. Mr. Jones" office phone number is (555)-852-1212. Do you wish to be connected directly to Mr. Jones?
(Caller): "Yes."
(System): "Your call is being connected now. Please hold."

Thus, in general, each of the one or more goal-directed prompts of a particular sequence corresponds to a particular user-oriented task and is intended to illicit a certain type of response from the user. Illustratively, the goal-directed prompts are implemented as verbal prompts generated by a text-to-speech module 112 configured for execution by the computing device 100 and conveyed to the user via a speaker 114 connected to the computing device. Other mechanisms also can be employed for conveying goal-directed prompts to a user, such as, for example, via visual prompts conveyed to the user via a visual interface (not shown) connected to the computing device 100. Alternately, the prompts can be audible prompts conveyed to the user via a hardwired or wireless connection. These other mechanisms can be employed in lieu of or in conjunction with the verbal prompts conveyed directly to the user via the speaker 114.

Illustratively, the system 104 further includes an error recovery module 116 for responding to a communication error. Communication errors can arise in distinct ways. The user's speech may be too loud or too soft, for example. The user's speech, alternatively, may be unrecognizable by the speech recognition module 108. Even if the user's speech comprises recognizable sounds uttered at an appropriate volume, the specific word or words may have meanings that do not communicate an appropriate response in the context of a particular prompt. Apart from the recognizability and meaning of the individual words, their syntax in the context of a particular dialog may not make sense. Accordingly, a communication error or interruption in a particular dialog can stem from an acoustical error, a lexical error, a syntactical error, or a conceptual error, for example. The error recovery module 116 handles such communication errors in the manner described below so that the particular dialog can be completed.

In response to a communication error, the error recovery module 116 initiates an error recovery. The error recovery is carried out by the error recovery module 116 providing at least one error-recovery prompt. Each error recovery prompt is selected from a hierarchy of error-recovery prompts. The particular error-recovery prompt supplied by the error recovery module is selected based upon a corresponding hierarchy of communication error types. Illustratively, the hierarchy of communication error types includes acoustical errors, lexical errors, syntactical errors, and conceptual errors.

The error recovery can be effected by the error recovery module 116 determining whether an acoustical error has occurred based upon the auditory level of the user response to at least one of the goal-directed auditory prompts provided by the auditory prompt module 110. Alternatively, the error recovery module 116 can carry out the error recovery by determining whether an acoustical error has occurred based upon an indeterminate response, in which event the goal-directed prompt may be repeated, with or with emphasis on main content words.

In the event that an acoustical error is determined by the error recovery module 116 to have occurred, an acoustical error prompt is provided in response thereto by the error recovery module. The acoustical error prompt, for example, can prompt the user to repeat a response at a different volume if the initial user response was either too loud or too soft. Alternately, if the acoustical error is determined on the basis of the indeterminate grammar, the error recovery module 116 can provide the user with a repetition of the goal-directed prompt to which the user was responding. The repetition optionally can emphasize certain main-content words to make the goal-directed prompt more understandable by the user.

For example, in the context of the earlier scenario concerning automated directory assistance, a communication error and error-recovery may occur in the dialog as follows:

(System): "Welcome to directory assistance. What is the name of the person you wish to contact?"
(Caller): INDETERMINATE RESPONSE (e.g., "huh?")
(System): "Please provide a name for the person you wish to contact."

Additionally, the error recovery module 116 can carry out the error recovery by determining whether a lexical error has occurred based upon a search for a match between a user response and a list of pre-designated acceptable responses, where both the user response and the list of pre-designated acceptable responses correspond to the same goal-directed auditory prompt. If there is no match, then the error recovery module determines that a lexical error has occurred. Error recovery is accomplished by the error recovery module 116 providing a lexical error prompt in response to the lexical error. According to one embodiment, the lexical error prompt can provide the user with a list of appropriate responses for the particular goal-directed prompt to which the user was responding when the lexical error occurred.

The error recovery module 116 also can effect the error recovery by determining whether a syntactical error has occurred based upon a parts-of-speech evaluation of the user response and a search for a match between parts of speech identified by the parts-of-speech evaluation and parts of speech contained in a set of expected parts of speech. Both the user response and the set of expected parts of speech each correspond to the same goal-directed auditory prompt. If the syntactical error is determined to have occurred, the error recovery module 116 provides a syntactical error prompt in response to the syntactical error. The syntactical error recovery prompt, according to another embodiment, can provide to the user a re-phrased version of the goal-directed prompt to which the user was responding when the syntactical error occurred. This re-phrased version can be based on an alternative syntax, such as providing the goal-directed prompt in the form of a sentence instead of a question.

Referring again to the earlier scenario concerning a directory assistance application, the following dialog provides an example of a user response, deemed by the error recovery module 116 to be a syntactical error, and the alternative syntax error-recovery prompt supplied by the error recovery module in response thereto:

(System): "Welcome to directory assistance. What is the name of the person you wish to contact?"
    (Caller): "I wanted to talk to someone about getting some information about one of your products."
    (System): "You may say the name of a specific person or specific department, such as Bob Jones or Accounting."

A conceptual error can occur in at least two different ways. For example, a conceptual error can occur whenever the user fails to provide any auditory response within a predefined time interval. Accordingly, the error recovery module 116 determines that a conceptual error has occurred if the user fails to provide an auditory response to a goal-directed auditory prompt within the predefined time interval. If the error recovery module 116 determines based upon the absence of a timely user response to a goal-directed prompt that a conceptual error indeed has occurred, the error recovery module responds by providing a conceptual error prompt.

The following dialog illustrates how the error recovery module 116 might handle such a communication error in the context of the directory assistance application:

(System): "Welcome to directory assistance. What is the name of the person you wish to contact?"
    (Caller): NO RESPONSE (time-out expiration)
    (System): "This directory response provides contact information for employees and departments. Or, if you would like to speak to a customer service representative, please respond by saying OPERATOR."

At least one other way in which a conceptual error can occur is if the user response to a particular goal-directed auditory prompt is inconsistent with the context of the particular prompt. In such event, the error recovery module 116 determines that a conceptual error in the form of an out-of-context user response has occurred. In response thereto, the error recovery module 116 provides a conceptual error prompt.

The error recovery effected by the system 104 can further include determining a type of the communication error. The type of a particular communication error is determined by the error recovery module 116, which can additionally analyze each user response to the sequence of one or more goal-directed auditory prompts provided by the auditory prompt module 110. Based upon the user response, the type of the communication error is determined. The analysis, more particularly, can comprise a sequential analysis in which the error recovery performed by the system further includes determining whether a communication error is a first type of communication error corresponding to the hierarchy of communication error types, and, if not, determining whether the communication error is a second type corresponding to the hierarchy. This sequential analysis can be performed yet a third or more times as needed, being repeated until the type of the communication error has been correctly determined from among the hierarchy of communication error types.

Figure 2:
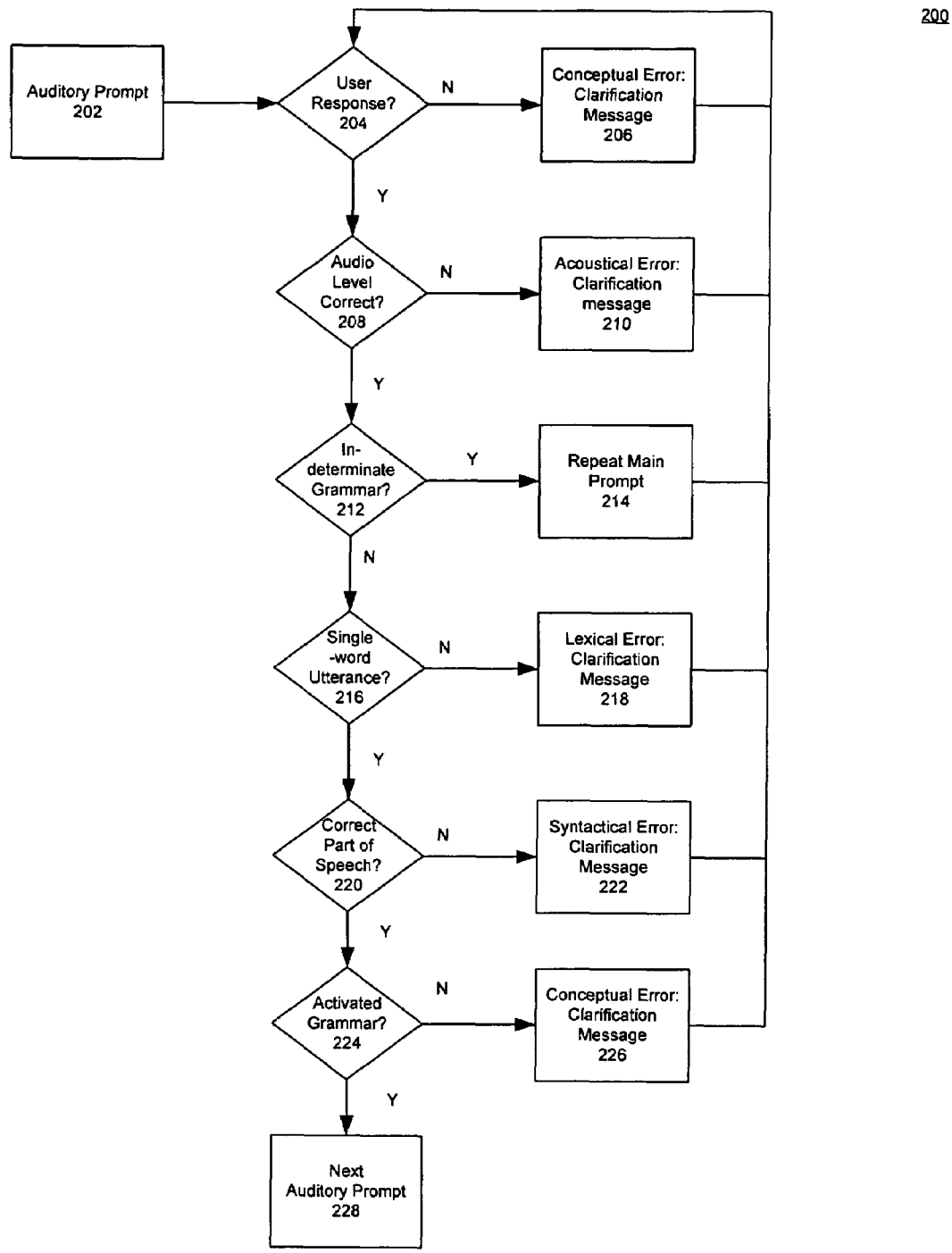
FIG. 2 is a flowchart illustrating a method for conducting a user dialog via a speech-based user interface according to one embodiment of the present invention.

FIG. 2 provides a flowchart of a method 200 for conducting a dialog via a user interface according to another embodiment of the present invention. As illustrated the method 200 includes at step 202 providing an auditory prompt, which can be part of a sequence comprising one or more goal-directed auditory prompts. If the user fails to provide a response to the auditory prompt within a predetermined time interval, a determination at step 204 is made that a conceptual error has occurred. Accordingly, a conceptual error clarification message is provided to the user at step 206.

The method 200 illustratively includes, at step 208, determining whether the volume at which the user provides a response is within a desired audible range. If not, a determination is made that an acoustic error has occurred. In response to such determination, an acoustic error prompt in the form of a clarification (e.g., instruction to the user to speak louder or more softly) message is provided in response to an acoustic error at step 210. If the user is unable to discern an auditory prompt, an error determination based upon an indeterminate grammar is made at step 212. The auditory prompt is repeated, optionally with a predetermined emphasis of certain words, at step 214 in the event of such an error.

Illustratively, the method 200 further includes determining whether a lexical error has occurred at step 216. If so, a lexical error prompt in the response of a clarification message is provided at step 218. A determination of whether a syntactical error has occurred is made at step 220, and if so, a syntactical error prompt is provided in the form a clarification message at step 222. A determination is also illustratively made at step 224 as to whether an out-of-context response to the goal-directed auditory prompt has been provided by the user, the determination being based on whether the response is within an activated grammar corresponding to the particular sequence of goal-directed auditory prompts. If an out-of-context error has occurred, a conceptual error prompt is provided at step 226. At each step, if an error has occurred, each of the preceding steps is repeated following provision of the particular error recovery prompt that is provided depending on the nature of the communication error.

It should be noted, that this iterative series of determinations according to the method 200 provides a mechanism for determining, at least approximately, the underlying nature of any communication error that occurs. Thus, by way of sequentially analyzing the user response to the goal-directed auditory prompt, the type of the communication error can be determined. The error-recovery prompt that is provided to the user corresponds to the type of communication error determined to have occurred. Accordingly, each error recovery prompt can be targeted to uniquely address each communication error in accordance with the type of the communication error that has occurred. This process can be repeated until the communication error is corrected by the user provided an acceptable response to the goal-directed auditory prompt that initially gave rise to the communication error. Once each of the steps has been completed without an error determination, the next goal-directed prompt is provided if any remain in the particular dialog being conducted.

As noted already, the present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A method for conducting a user dialog via a speech-based user interface, the method comprising:
   providing a sequence of goal-directed auditory prompts, the sequence of goal-directed auditory prompts being based upon a pre-determined user-oriented task;
   for each prompt, determining if there is a communication error; and
   if a communication error occurs, responding to the communication error by initiating an error recovery including:
      determining a type of the communication error from a hierarchy of communication error types based upon a sequential analysis of a user response to the particular prompt, the hierarchy of communication error types including an acoustical error, a lexical error, a syntactical error, and a conceptual error, wherein an acoustical error occurs when a volume at which the user response is provided is not within a predetermined audible range, wherein a lexical error occurs when there is no match between the user response and a list of pre-designated acceptable responses, wherein a syntactical error occurs when there is no match between parts of speech of the user response and expected parts of speech, and wherein a conceptual error occurs when a user fails to provide any auditory response within a predefined time interval or when the user response is not within an activated grammar corresponding to the sequence of goal-directed auditory prompts; and
      providing at least one error-recovery prompt selected from a hierarchy of error-recovery prompts, the selection being based upon the determination of the type of communication error.

2. The method of claim 1, wherein the error recovery comprises:
   if it is determined that an acoustical error has occurred, providing an acoustical error prompt in response thereto.

3. The method of claim 1, wherein the error recovery comprises:
   if it is determined that a lexical error has occurred, providing a lexical error prompt in response thereto.

4. The method of claim 1, wherein the error recovery comprises:
   if it is determined that a syntactical error has occurred, providing a syntactical error prompt in response thereto 5. The method of claim 1, wherein the error recovery comprises:
   determining whether a conceptual error has occurred based upon a non-auditory user response within a predefined time period; and
   if it is determined that a conceptual error has occurred, providing a conceptual error prompt in response thereto.

6. A system for conducting a user dialog via a speech-based user interface, the system comprising:
   an auditory prompt module for generating a sequence of goal-directed auditory prompts, the sequence of goal-directed auditory prompts being based upon a pre-determined user-oriented task; and
   an error recovery module for responding to a communication error by initiating an error recovery based upon a user response to a particular prompt of the sequence of goal-directed auditory prompts;
   wherein the error recovery comprises:
      determining a type of the communication error from a hierarchy of communication error types based upon a sequential analysis of a user response to the particular prompt, the hierarchy of communication error types including an acoustical error, a lexical error, a syntactical error, and a conceptual error, wherein an acoustical error occurs when a volume at which the user response is provided is not within a predetermined audible range, wherein a lexical error occurs when there is no match between the user response and a list of pre-designated acceptable responses, wherein a syntactical error occurs when there is no match between parts of speech of the user response and expected parts of speech, and wherein a conceptual error occurs when a user fails to provide any auditory response within a predefined time interval or when the user response is not within an activated grammar corresponding to the sequence of goal-directed auditory prompts; and
      providing at least one error-recovery prompt sequentially selected from a hierarchy of error-recovery prompts, the sequential selection being based upon the determination of the type of communication error.

7. The system of claim 6, wherein the error recovery comprises:
   if it is determined that an acoustical error has occurred, providing an acoustical error prompt in response thereto.

8. The system of claim 6, wherein the error recovery comprises:
   if it is determined that a lexical error has occurred, providing a lexical error prompt in response thereto.

9. The system of claim 6, wherein the error recovery comprises:
   if it is determined that a syntactical error has occurred, providing a syntactical error prompt in response thereto.

10. The system of claim 6, wherein the error recovery comprises:
    if it is determined that a conceptual error has occurred, providing a conceptual error prompt in response thereto.

11. A computer-readable storage medium for conducting a user dialog via a speech-based user interface, the storage medium comprising computer instructions for:
    providing a sequence of goal-directed auditory prompts, the sequence of goal-directed auditory prompts being based upon a pre-determined user-oriented task;
    for each prompt, determining if there is a communication error; and
    if a communication error occurs, responding to the communication error by initiating an error recovery including:
       determining a type of the communication error from a hierarchy of communication error types based upon a sequential analysis of a user response to the particular prompt, the hierarchy of communication error types including an acoustical error, a lexical error, a syntactical error, and a conceptual error, wherein an acoustical error occurs when a volume at which the user response is provided is not within a predetermined audible range, wherein a lexical error occurs when there is no match between the user response and a list of pre-designated acceptable responses, wherein a syntactical error occurs when there is no match between parts of speech of the user response and expected parts of speech, and wherein a conceptual error occurs when a user fails to provide any auditory response within a predefined time interval or when the user response is not within an activated grammar corresponding to the sequence of goal-directed auditory prompts; and providing at least one error-recovery prompt selected from a hierarchy of error-recovery prompts, the selection being based upon the determination of the type of communication error.

* * * * *